US006913655B2

(12) United States Patent
Jackson et al.

(10) Patent No.: US 6,913,655 B2
(45) Date of Patent: Jul. 5, 2005

(54) NIOBIUM-SILICIDE BASED COMPOSITIES RESISTANT TO HIGH TEMPERATURE OXIDATION

(75) Inventors: Melvin Robert Jackson, Niskayuna, NY (US); Bernard Patrick Bewlay, Schenectady, NY (US); Ji-Cheng Zhao, Latham, NY (US)

(73) Assignee: General Electric Company, Niskayuna, NY (US)

( * ) Notice: Subject to any disclaimer, the term of this patent is extended or adjusted under 35 U.S.C. 154(b) by 302 days.

(21) Appl. No.: 10/263,527

(22) Filed: Oct. 3, 2002

(65) Prior Publication Data

US 2003/0066578 A1 Apr. 10, 2003

Related U.S. Application Data

(63) Continuation-in-part of application No. 09/735,767, filed on Dec. 13, 2000, now abandoned.

(51) Int. Cl.$^7$ .............................................. C22C 27/02
(52) U.S. Cl. ...................................... 148/422; 420/426
(58) Field of Search .......................... 148/422; 420/426

(56) References Cited

U.S. PATENT DOCUMENTS

| | | | |
|---|---|---|---|
| 5,393,487 A | | 2/1995 | Matway et al. |
| 5,741,376 A | | 4/1998 | Subramanian et al. |
| 5,833,773 A | | 11/1998 | Bewlay et al. |
| 5,932,033 A | | 8/1999 | Jackson et al. |
| 5,942,055 A | | 8/1999 | Jackson et al. |
| 6,409,848 B1 | * | 6/2002 | Bewlay et al. ............... 148/422 |
| 6,419,765 B1 | * | 7/2002 | Jackson et al. ............. 148/422 |
| 6,428,910 B1 | * | 8/2002 | Jackson et al. ............. 428/660 |

OTHER PUBLICATIONS

M. R. Jackson, et al, High–Temperature Refractory Metal–Intermetallic Composites, *Journal of Metals*, Jan., 1996.
B. P. Bewlay, et al., Refractory Metal–Intermetallic In–Situ Composites for Aircraft Engines, Reprinted from *JOM*, vol. 49, No. 8, Aug., 1997, p. 44–45; p. 67.
B. P. Bewlay, et al., Evidence for the Existence of Hf$_5$Si$_3$, *Journal of Phase Equilibria*, vol. 20, No. 2, 1999.

B. P. Bewlay, et al., Processing High–Temperature Refractory–Metal Silicide In–Situ Composites, Reprinted from *JOM*, vol. 51, No. 4, Apr., 1999, p. 32–36.
P. R. Subramanian, et al., Compressive Creep Behavior of Nb$_5$Si$_3$, *Scripta Metallurgica et Materialia*, vol. 32, No. 8, pp. 1227–1232, 1995.
B. P. Bewlay, et al., The Nb–Ti–Si Ternary Phase Diagram: Evaluation of Liquid–Solid Phase Equilibria in Nb– and Ti–Rich Alloys, *Journal of Phase Equilibria*, vol. 18, No. 3, 1997.
B. P. Bewlay, et al, The Nb–Hf–Si Ternary phase Diagram: Liquid–Solid Phase Equilibria in Nb–0 and Hf–rich Alloys, *z. Metallkd*, 90, 1999.
B. P. Bewlay, et al., The Nb–Ti–Si Ternary Phase Diagram: Determination of Solid–State Phase Equilibria in Nb– and Ti–Rich Alloys, *Journal of Phase Equilibria*, vol. 19, No. 6, 1998.

\* cited by examiner

*Primary Examiner*—Sikyin Ip
(74) *Attorney, Agent, or Firm*—Penny A. Clarke; Patrick K. Patnode

(57) ABSTRACT

A niobium-silicide refractory metal intermetallic composite adapted for use in a turbine component. The niobium-silicide refractory metal intermetallic composite comprises: between about 19 atomic percent and about 24 atomic percent titanium; between about 1 atomic percent and about 5 atomic percent hafnium; between about 16 atomic percent and about 22 atomic percent silicon; between about 7 atomic percent and about 14 atomic percent chromium; from about 1.5 atomic percent to about 3 atomic percent tin; and a balance of niobium. The niobium silicide refractory intermetallic composite contains a tetragonal phase, which comprises a volume fraction from 0.35 to 0.5 of the niobium silicide refractory intermetallic composite, and a hexagonal M$_3$Si$_5$ silicide phase (wherein M is at least one of Nb and Hf) which comprises a volume fraction comprises less than 0.25 of the niobium silicide refractory intermetallic composite. A ratio of the sum of atomic percentages of niobium and tantalum present in said niobium silicide refractory intermetallic composite to the sum of atomic percentages of titanium and of hafnium present in said niobium silicide refractory intermetallic composite has a value from 1.5 to 2.0.

18 Claims, No Drawings

NIOBIUM-SILICIDE BASED COMPOSITIES RESISTANT TO HIGH TEMPERATURE OXIDATION

This is a continuation-in-part of Application Ser. No. 09/735,767, filed Dec. 13, 2000, now abandoned.

This invention was made with Government support under Contract No. F33615-98-C-5215, awarded by the United States Air Force, Department of Defense, and the United States Government therefore has certain rights in the invention.

BACKGROUND OF THE INVENTION

The invention relates to Niobium (Nb)-silicide based composite compositions. In particular, the invention relates to Nb-silicide based composite compositions having properties that permit the Nb-silicide based composite compositions to find applications in turbine components.

Turbines and their components (hereinafter "turbine components"), such as, but not limited to, aeronautical turbines, land-based, turbines, marine-based turbines, and the like, have typically been formed from nickel (Ni)-based materials, which are often referred to as Ni-based superalloys. Turbine components formed from these Ni-based superalloys exhibit desirable chemical and physical properties under the high temperature, high stress, and high-pressure conditions generally encountered during turbine operation. For example, turbine components, such as an airfoil, in modern jet engines can reach temperatures as high as about 1,150° C., which is about 85% of the melting temperatures ($T_m$) of most Ni-based superalloys.

Because Ni-based superalloys have provided the level of performance desired in such applications, the development of such Ni-based superalloys has been widely explored. Consequently, the field has matured and few significant improvements have been realized in this area in recent years. In the meantime, efforts have been made to develop alternative turbine component materials. These alternate materials include niobium (Nb)-based refractory metal intermetallic composites (hereinafter "RMIC"s). Most RMICs have melting temperatures of about 1700° C. If RMICs can be used at about 80% of their melting temperatures, they will have potential use in applications in which the temperature exceeds the current service limit of Ni-based superalloys.

RMICs comprising at least niobium (Nb), silicon (Si), titanium (Ti), hafnium (Hf), chromium (Cr), and aluminum (Al) have been proposed for turbine component applications. These silicide-based RMICs exhibit a high temperature capability that exceeds that of current Ni-based superalloys. Exemplary silicide-based RMICs are set forth in U.S. Pat. No. 5,932,033, to M. R. Jackson and B. P. Bewlay, entitled "Silicide Composite with Nb-Based Metallic Phase and Si-Modified Laves-Type Phase" and U.S. Pat. No. 5,942,055, to Jackson and Bewlay, entitled "Silicide Composite with Nb-Based Metallic Phase and Si-Modified Laves-Type Phase".

Some known Nb-silicide based composites—including silicide-based RMIC materials—have adequate oxidation resistance characteristics for turbine component applications. These materials have compositions within the following approximate ranges: 20–25 atomic percent titanium (Ti), 1–5 atomic percent hafnium (Hf), and 0–2 atomic percent tantalum (Ta), where the concentration ratio (Nb+Ta):(Ti+Hf) has a value of about 1.4; 12–21 atomic percent silicon (Si), 2–6 atomic percent germanium (Ge), and 2–5 atomic percent boron (B), where the sum of the Si, B, and Ge concentrations is in the range between 22 atomic percent and 25 atomic percent; 12–14 atomic percent chromium (Cr) and 0–4 atomic percent iron (Fe), where the sum of the Fe and Cr concentrations is between 12 atomic percent and 18 atomic percent; 0–4 atomic percent aluminum (Al); 0–3 atomic percent tin (Sn); and 0–3 atomic percent tungsten (W). Other known Nb-based silicide composites—including silicide-based RMIC materials—possess adequate creep-rupture resistance for turbine component applications. These materials have compositions within the following approximate ranges: 16–20 atomic percent Ti, 1–5 atomic percent Hf, and 0–7 atomic percent Ta, where the concentration ratio (Nb+Ta):(Ti+Hf) has a value of about 2.25; 17–19 atomic percent Si, 0–6 atomic percent Ge, and 0–5 atomic percent B, where the sum of the Si, B, and Ge concentrations is in the range between 17 atomic percent and 21 atomic percent; 6–10 atomic percent Cr and 0–4 atomic percent Fe, where the sum of the Fe and Cr concentrations is in the range between 6 atomic percent and 12 atomic percent; 0–4 atomic percent Al; 0–3 atomic percent Sn; 0–3 atomic percent W; and 0–3 atomic percent Mo. In addition, some known Nb-silicide based composites—including silicide-based RMIC materials—have adequate fracture toughness for turbine component applications. Such materials contain greater than or equal to about 30 volume percent of metallic phases present in such components.

Although the above Nb-silicide based composites and silicide-based RMIC materials possess beneficial mechanical and chemical properties, they do not adequately balance oxidation resistance properties with toughness and creep resistance properties. Thus, a single silicide-based RMIC alloy material composition that can provide adequate creep, oxidation resistance, and toughness for turbine component applications is currently not available.

While the oxidation performance and creep-rupture resistance for turbine component applications of known RMICs are desirable, these materials and their properties may still be further improved for turbine component applications. For example, the chemistries and compositions of the RMIC material may be modified to enhance oxidation resistance for applications that subject the turbine component to high stresses at temperatures ranging from about 1300° F. to about 1700° F. (about 700° C. to about 925° C.) over extended periods of time.

Therefore, what is needed is a material having a composition, chemistry, and properties that are suitable for various applications such as, but not limited to, turbine components, in which high stresses at elevated temperatures are encountered over long periods of time. More particularly, what is needed is a Nb-silicide based RMIC having improved oxidation resistance and creep resistance for use in turbine component applications in which high stresses at elevated temperatures are encountered over long periods of time.

SUMMARY OF THE INVENTION

Accordingly, one aspect of the present invention is to provide a turbine component formed from a niobium silicide refractory intermetallic composite, the niobium silicide refractory intermetallic composite comprising: between about 19 atomic percent and about 24 atomic percent titanium; between about 1 atomic percent and about 5 atomic percent hafnium; between about 16 atomic percent and about 22 atomic percent silicon; between about 7 atomic percent and about 14 atomic percent chromium; and a balance of niobium.

A second aspect of the invention is to provide a niobium suicide refractory intermetallic composite adapted for use in a turbine component. The niobium silicide refractory intermetallic composite comprises: between about 19 atomic percent and about 24 atomic percent titanium; between about 1 atomic percent and about 5 atomic percent hafnium; up to about 7 atomic percent tantalum; between about 16 atomic percent and about 22 atomic percent silicon; up to about 6 atomic percent germanium; up to about 5 atomic percent boron; between about 7 atomic percent and about 14 atomic percent chromium; up to about 4 atomic percent iron; up to about 4 atomic percent aluminum; up to about 3 atomic percent tin;, up to about 3 atomic percent tungsten; up to about 3 atomic percent molybdenum; and a balance of niobium. A ratio of a sum of atomic percentages of niobium and tantalum present in the niobium silicide refractory intermetallic composite to a sum of atomic percentages of titanium and hafnium present in the niobium suicide refractory intermetallic composite has a value of between about 1.4 and about 2.2 (i.e., 1.4<(Nb+Ta):(Ti+Hf)<2.2). Chromium and iron together comprise between about 7 atomic percent and about 15 atomic percent of the niobium silicide refractory intermetallic composite, and silicon, germanium, and boron together comprise between about 16 atomic percent and about 22 atomic percent of the niobium silicide refractory intermetallic composite.

A third aspect of the invention is to provide a turbine component formed from a niobium silicide refractory intermetallic composite, the niobium silicide refractory intermetallic composite comprising: between about 19 atomic percent and about 24 atomic percent titanium; between about 1 atomic percent and about 5 atomic percent hafnium; up to about 7 atomic percent tantalum; between about 16 atomic percent and about 22 atomic percent silicon; up to about 6 atomic percent germanium; up to about 5 atomic percent boron; between about 7 atomic percent and about 14 atomic percent chromium; up to about 4 atomic percent iron; up to about 4 atomic percent aluminum; up to about 3 atomic percent tin; up to about 3 atomic percent tungsten; up to about 3 atomic percent molybdenum; and a balance of niobium.

DETAILED DESCRIPTION OF THE INVENTION

The niobium (Nb)-silicide based alloy composite of the present invention comprises Nb-silicide refractory metal intermetallic composites (hereinafter "RMICs") having compositions and chemical properties that provide the necessary balance among oxidation characteristics, creep resistance, and toughness. The Nb-silicide RMICs comprise between about 19 atomic percent and about 24 atomic percent titanium; between about 1 atomic percent and about 5 atomic percent hafnium; up to about 7 atomic percent tantalum; between about 16 atomic percent and about 22 atomic percent silicon; up to about 6 atomic percent germanium; up to about 5 atomic percent boron; between about 7 atomic percent and about 14 atomic percent chromium; up to about 4 atomic percent iron; up to about 4 atomic percent aluminum; up to about 3 atomic percent tin; up to about 3 atomic percent tungsten; up to about 3 atomic percent molybdenum; and a balance of niobium, wherein a ratio of a sum atomic percentages of niobium and tantalum present in the niobium silicide refractory intermetallic composite to a sum of atomic percentages of titanium hafnium present in the niobium silicide refractory intermetallic composite has a value of between about 1.4 and about 2.2 (i.e., 1.4<(Nb+Ta):(Ti+Hf)<2.2), wherein chromium and iron together comprise between about 7 atomic percent and about 15 atomic percent of the niobium silicide refractory intermetallic composite; and wherein silicon, germanium, and boron together comprise between about 16 atomic percent and about 22 atomic percent of the niobium silicide refractory intermetallic composite. The atomic percent given for each element are approximate unless otherwise specified.

The Nb-silicide based RMICs of the present invention exhibit oxidation and rupture resistance characteristics which are provided by the addition of Si, Cr and Al, and lesser amounts of Ti, Hf, and B. The Nb-silicide RMICs disclosed in the present invention can be used to form turbine components such as, but not limited to, buckets, blades, rotors, nozzles, and the like for applications in land-based turbines, marine turbines, aeronautical turbines, power generation turbines, and the like.

The presence of a tetragonal $M_5Si_3$ silicide (where M is titanium, hafnium, or combinations thereof) phase (Pearson symbol crystal structure tI32; structure/space group: tetragonal 4/mmm) in the Nb-silicide RMIC promotes both oxidation and creep resistance in the temperature range from about 1800° F. to about 2400° F. Formation of a hexagonal $M_5Si_3$ silicide (where M is titanium, hafnium, or combinations thereof) phase (Pearson crystal structure hP16; structure/space group: hexagonal 6/mmm), on the other hand, is detrimental to creep resistance. Formation of the hexagonal phase is aided when the (Nb+Ta):(Ti+Hf) ratio of the Nb-silicide RMIC has a value of less than 1.5. Table 1 lists values for the ratio (Nb+Ta):(Ti+Hf), volume fraction of the tetragonal phase present in the Nb-silicide RMIC, and volume fraction for the hexagonal phase present in the Nb-silicide RMIC. The data in Table 1 show that in those Nb-silicide RMICs in which the volume fraction of the tetragonal phase is in the range from 0.35 to 0.5, the volume fraction of the hexagonal phase is less than 0.25, and the (Nb+Ta):(Hf+Ti) composition ratio is in the range from 1.5 to 2.0, superior oxidation is achieved in the temperature range from about 1800° F. to about 2400° F. Higher volume fractions of the tetragonal phase are preferred, as indicated by the oxidation performance of Alloy A22. Referring to Table 1, Alloys A22 and A24, each having a tetragonal phase volume fraction in the range from 0.35 to 0.5, and a hexagonal volume fraction of less than 0.25, exhibit the greatest level of oxidation resistance across a broad range of temperatures. Oxidation resistance decreases from the maximum values when the (Nb+Ta):(Hf+Ti) composition ratio is greater than 2.0, and when the volume fraction of the tetragonal phase is less than 0.35. Alloy A24, which has a tetragonal phase volume fraction that is close to 0.35, exhibits a decrease in oxidation resistance at 2400° F. The changes in sample weight observed for Alloy A23 are attributed to spallation caused by expansion of the oxide.

Samples A2, A4, A21, A22, A24, A25, and A26 represent the preferred Nb-silicide RMIC compositions of the present invention. These alloys exhibited radius changes due to oxidation of less than or equal to about 5.5 mils (about 140 microns) after 100 hours at temperatures in the range from about 1800° F. to about 2200° F., and less than or equal about 32 mils (about 810 microns) after about 73 hours at a temperature of about 2400° F. A weight change occurring with little change in radius in a refractory material alloy is indicative of oxidation attack at the ends of the sample. This type of oxidation leads to rounding of the sample edges, even though the degree of radial attack on the pin is small.

The Nb-silicide RMICs of the present invention include constituents that reduce the oxide growth rate in Nb-silicide RMICs containing additional metallic and Laves-type phases. In the present invention, Laves-type phases preferably comprise up to about 20 volume percent of the Nb-silicide RMICs. Metallic phases preferably comprise at least 25 volume percent of the Nb-silicide RMICs. Maintaining a relatively high level of titanium in the Nb-silicide RMIC improves material oxidation resistance. Increasing the titanium concentration, however, tends to increase creep rate. Thus, the composition of the Nb-based RMICs must be adjusted to balance desired creep performance with oxidation performance.

EXAMPLE 1

A series of Nb-silicide RMIC samples, as embodied by the present invention, were prepared by arc casting tapered disks about 0.8" thick and with a diameter tapering from about 2.5" to about 3". Pins having a diameter of about a 0.12" and a length of about a 1.25" were prepared by conventional machining processes, such as EDM and centerless grinding. The pins were then subjected to 100 hours exposure (hot time) with a total test exposure of about 117 hours in one-hour cycles. The heating cycles were followed with cooling to room temperature after each hour of hot time at either 1800° F. (982° C.), 2000° F. (1095° C.), 2200° F. (1205° C.), (1315° C.).

Each Nb-silicide RMIC sample was weighed before testing, periodically during the tests, and after testing to determine an average weight change per unit area as a function of exposure time. Each sample was then cut at its approximate mid-section and prepared for metallographic evaluation of changes in diameter and in microstructure. Evaluation of the samples was not necessarily limited to a metallographic examination.

Results of the weight change (listed in columns labeled 'wt') and metallographic measurements of diameter changes (listed in columns labeled 'mil') obtained at completion of the test are listed as a function of alloy composition for a series of Nb-silicide RMICs in Table 1. The atomic percentages listed in Table 1 are approximate. Values for the (Nb+Ta):(Ti+Hf) ratio are also provided.

TABLE 1

CYCLIC OXIDATION RESULTS FOR ARC CAST COMPOSITE ALLOYS

| Sample | ratio | Vol. Fraction Tetragonal Phase (tI32) | Vol. Fraction Hexagonal Phase (hP16) | Nb | Ti | Hf | Si | Al | Cr | B | Ta | Ge | Mo |
|---|---|---|---|---|---|---|---|---|---|---|---|---|---|
| A1 | 1.52 | 0.30 | 0.15 | 41.0 | 23.0 | 4 | 17 | 2 | 13 | | | | |
| A2 | 1.51 | 0.36 | 0.20 | 38.5 | 21.5 | 4 | 17 | 2 | 13 | 4 | | | |
| A3 | 1.52 | 0.30 | 0.15 | 35.0 | 23.0 | 4 | 17 | 2 | 13 | | 6 | | |
| A4 | 1.52 | 0.30 | 0.15 | 41.0 | 23.0 | 4 | 12 | 2 | 13 | | | 5 | |
| A5 | 1.57 | 0.32 | 0.13 | 40.5 | 22.5 | 4 | 17 | 2 | 13 | | | | 1 |
| A6 | 1.57 | 0.32 | 0.13 | 40.5 | 22.5 | 4 | 17 | 2 | 13 | | | | |
| A7 | 1.51 | 0.30 | 0.15 | 40.0 | 22.5 | 4 | 17 | 2 | 13 | | | | |
| A8 | 1.51 | 0.30 | 0.15 | 40.0 | 22.5 | 4 | 17 | 2 | 13 | | | | |
| A9 | 1.55 | 0.30 | 0.15 | 42.5 | 23.5 | 4 | 17 | | 13 | | | | |
| A10 | 1.55 | 0.30 | 0.15 | 42.5 | 25.5 | 2 | 17 | | 13 | | | | |
| A11 | 2.5 | 0.45 | None | 48.5 | 15.5 | 4 | 17 | 2 | 13 | | | | |
| A12 | 2.5 | 0.45 | None | 46.0 | 14.0 | 4 | 17 | 2 | 13 | 4 | | | |
| A13 | 2.5 | 0.45 | None | 42.5 | 15.5 | 4 | 17 | 2 | 13 | | 6 | | |
| A14 | 2.5 | 0.56 | None | 48.5 | 15.5 | 4 | 12 | 2 | 13 | | | 5 | |
| A15 | 2.5 | 0.45 | None | 48.0 | 15.0 | 4 | 17 | 2 | 13 | | | | 1 |
| A16 | 2.5 | 0.45 | None | 48.0 | 15.0 | 4 | 17 | 2 | 13 | | | | |
| A17 | 2.5 | 0.45 | None | 47.5 | 15.0 | 4 | 17 | 2 | 13 | | | | |
| A18 | 2.5 | 0.45 | None | 47.5 | 15.0 | 4 | 17 | 2 | 13 | | | | |
| A19 | 2.5 | 0.45 | None | 50.0 | 16.0 | 4 | 17 | | 13 | | | | |
| A20 | 2.5 | 0.45 | None | 50.0 | 18.0 | 2 | 17 | | 13 | | | | |
| A21 | 1.58 | 0.38 | 0.18 | 32.5 | 23.0 | 2 | 17 | | 13 | 4 | 6 | | 1 |
| A22 | 1.59 | 0.47 | 0.22 | 29.5 | 21.0 | 2 | 17 | | 13 | 4 | 6 | 5 | |
| A23 | 1.53 | 0.35 | 0.18 | 40.5 | 22.5 | 4 | 20 | | 13 | | | | |
| A24 | 1.53 | 0.35 | 0.18 | 40.5 | 22.5 | 4 | 15 | | 13 | | | 5 | |
| A25 | 1.50 | 0.35 | 0.18 | 39 | 24 | 2 | 15 | 2 | 10 | | | 5 | |
| A26 | 2.0 | 0.53 | none | 43.3 | 19.7 | 2 | 15 | 2 | 10 | | | 5 | |

| Sample | W | Sn | Fe | 1800 wt | 1800 mil | 2000 wt | 2000 mil | 2200 wt | 2200 mil | 2400 wt | 2400 hour | 2400 mil |
|---|---|---|---|---|---|---|---|---|---|---|---|---|
| A1 | | | | −193 | −12 | −255 | −4 | −216 | −3 | −455 | 73 | −39 |
| A2 | | | | −55 | −5 | −25 | −2.5 | −48 | −3.5 | −284 | 100 | −16 |
| A3 | | | | −361 | −21 | −147 | 0 | −143 | −3 | −360 | 31 | −22 |
| A4 | | | | −28 | −3 | 7 | 0 | −38 | −4 | −321 | 100 | −28 |
| A5 | | | | −61 | −4 | −132 | −7 | −222 | −13.5 | −405 | 52 | xx |
| A6 | 1 | | | −201 | −3 | −207 | −9 | −105 | −3 | −423 | 3 | −35 |
| A7 | | 1.5 | | −151 | −7 | −439 | −32 | −88 | −2.5 | −350 | 73 | −22 |
| A8 | | | 2 | No test | | No test | | −37 | −2 | −441 | 73 | −31 |
| A9 | | | | −95 | −6 | −153 | −6.5 | −129 | −6 | −495 | 73 | −38 |
| A10 | | | | −260 | −17 | −161 | −5 | −111 | −6 | −489 | 73 | −52 |
| A11 | | | | dust | −60 | dust | −60 | −420 | −28 | −470 | 31 | −37 |
| A12 | | | | −372 | −60 | −210 | −13 | −302 | −23.5 | −322 | 31 | −26 |
| A13 | | | | xx | xx | xx | xx | No | No test | xx | xx | xx |

TABLE 1-continued

CYCLIC OXIDATION RESULTS FOR ARC CAST COMPOSITE ALLOYS

| | | | | | | | | test | | | | |
|---|---|---|---|---|---|---|---|---|---|---|---|---|
| A14 | | | | | −39 | −3 | −22 | −2 | −148 | −13.5 | −460 | 73 | −30 |
| A15 | | | | | −475 | −40 | No test | | (−492) | −60 | −393 | 31 | −31 |
| A16 | 1 | | | | dust | −60 | dust | −60 | −482 | −37 | −387 | 31 | −25 |
| A17 | | 1.5 | | | −381 | −27 | dust | −60 | (−484) | −60 | −482 | 73 | −40 |
| A18 | | | 2 | | dust | −60 | −372 | −22 | −275 | −16 | −397 | 31 | −32 |
| A19 | | | | | dust | −60 | dust | −60 | (−433) | −60 | −518 | 31 | −36 |
| A20 | | | | | dust | −60 | dust | −60 | −347 | −14.5 | −445 | 31 | −33 |
| A21 | | | 2 | | −35 | −3 | −20 | −3 | −102 | −5.5 | −222 | 100 | −14 |
| A22 | 1 | 1.5 | | | 7 | −5 | 10 | 0 | −17 | −1 | −175 | 100 | xx |
| A23 | | | | | −189 | −11 | −195 | −20 | −114 | −7 | −498 | 73 | −50 |
| A24 | | | | | −17 | −5 | 10 | 0 | 17 | −0.5 | −334 | 73 | −12 |
| A25 | | | 3 | | 9 | −1 | 14 | −1 | 6 | <1 | −264 | 100 | −15 |
| A26 | | | 3 | | −12 | −1 | 18 | −4 | −26 | −2 | −365 | 100 | −21 |

As can be seen from Table 1, the addition of boron and iron to the Nb-silicide RMICs of the present invention provide improves oxidation resistance over the temperature range of the tests. In addition, partial substitution of germanium for silicon in the Nb-silicide RMICs also improves oxidation resistance over the temperature range tested. Oxidation resistance of the Nb-silicide RMICs of the present invention over the temperature range tested is not degraded by the addition of either about 6 atomic percent tantalum or about 1 atomic percent tungsten. The presence of about 1 atomic percent molybdenum had a negative effect on the oxidation resistance of the Nb-silicide RMICs, and additions of about 1.5 atomic percent tin had a neutral effect on the high temperature oxidation resistance of the Nb-silicide RMICs.

While various embodiments are described herein, it will be appreciated from the specification that various combinations of elements, variations or improvements therein may be made by those skilled in the art, and are within the scope of the invention.

What is claimed is:

1. A turbine component formed from a niobium silicide refractory intermetallic composite, said niobium silicide refractory intermetallic composite comprising: between about 19 atomic percent and about 24 atomic percent titanium; between about 1 atomic percent and about 5 atomic percent hafnium; between about 16 atomic percent and about 22 atomic percent silicon; between about 7 atomic percent and about 14 atomic percent chromium; from about 1.5 atomic percent to about 3 atomic percent tin; and a balance of niobium, wherein said niobium silicide refractory intermetallic composite contains a tetragonal phase, said tetragonal phase comprising a volume fraction from 0.35 to 0.5 of said niobium silicide refractory intermetallic composite, and a hexagonal $M_5Si_3$ silicide phase, wherein M is at least one of Nb and Hf and wherein said hexagonal $M_5Si_3$ silicide phase comprises a volume fraction of less than 0.25 of said niobium silicide refractory intermetallic composite, and wherein a ratio of a sum of atomic percentages of niobium and tantalum present in said niobium silicide refractory intermetallic composite to a sum of atomic percentages of titanium and hafnium present in said niobium silicide refractory intermetallic composite has a value from 1.5 to 2.0.

2. The turbine component of claim 1, further comprising tantalum, germanium, boron, iron, aluminum, tungsten, and molybdenum.

3. The turbine component of claim 2, wherein chromium and iron together comprise between about 7 atomic percent and about 15 atomic percent of said niobium silicide refractory intermetallic composite; and wherein silicon, germanium, and boron together comprise between about 16 atomic percent and about 22 atomic percent of said niobium silicide refractory intermetallic composite.

4. The turbine component of claim 3, wherein said turbine component is a component selected from the group consisting of a bucket, a blade, a rotor, and a nozzle.

5. The turbine component of claim 3, wherein said turbine component is a component is a turbine selected from the group consisting of land-based turbines, marine turbines, aeronautical turbines, and power-generation turbines.

6. A niobium silicide refractory intermetallic composite adapted for use in a turbine component, said niobium silicide refractory intermetallic composite comprising: between about 19 atomic percent and about 24 atomic percent titanium; between about 1 atomic percent and about 5 atomic percent hafnium; up to about 7 atomic percent tantalum; between about 16 atomic percent and about 22 atomic percent silicon; up to about 6 atomic percent germanium; up to about 5 atomic percent boron; between about 7 atomic percent and about 14 atomic percent chromium; up to about 4 atomic percent iron; up to about 4 atomic percent aluminum; from about 1.5 atomic percent to about 3 atomic percent tin; up to about 3 atomic percent tungsten; up to about 3 atomic percent molybdenum; and a balance of niobium, wherein said niobium silicide refractory intermetallic composite contains a tetragonal phase, said tetragonal phase comprising a volume fraction from 0.35 to 0.5 of said niobium silicide refractory intermetallic composite, and a hexagonal $M_5Si_3$ silicide phase, wherein M is at least one of Nb and Hf and wherein said hexagonal $M_5Si_3$ silicide phase comprises a volume fraction of less than 0.25 of said niobium silicide refractory intermetallic composite, wherein a ratio of a sum of atomic percentages of niobium and tantalum present in said niobium silicide refractory intermetallic composite to a sum of atomic percentages of titanium and hafnium present in said niobium silicide refractory intermetallic composite has a value from 1.5 to 2.0, wherein chromium and iron together comprise between about 7 atomic percent and about 15 atomic percent of said niobium silicide refractory intermetallic composite; and wherein silicon, germanium, and boron together comprise between about 16 atomic percent and about 22 atomic percent of said niobium silicide refractory intermetallic composite.

7. The niobium silicide refractory intermetallic composite of claim 6, wherein said niobium silicide refractory intermetallic composite includes at least one metallic phase, said metallic phase comprising at least 30 volume percent of said niobium silicide refractory intermetallic composite.

8. The niobium silicide refractory intermetallic composite of claim 6, wherein said niobium silicide refractory intermetallic composite includes at least one Laves phase, said Laves phase comprising up to about 20 volume percent of said niobium silicide refractory intermetallic composite.

9. The niobium silicide refractory intermetallic composite of claim 6, wherein said niobium silicide refractory intermetallic composite is resistant to oxidation at temperatures in the range from between about 1800° F. to about 2200° F.

10. The niobium silicide refractory intermetallic composite of claim 9, wherein a radius of a cylindrical sample formed from said niobium silicide refractory intermetallic composite changes less than about 6 mils when heated to about 2200° F. for 100 hours.

11. A turbine component formed from a niobium silicide refractory intermetallic composite, said niobium silicide refractory intermetallic composite comprising: between about 19 atomic percent and about 24 atomic percent titanium; between about 1 atomic percent and about 5 atomic percent hafnium; up to about 7 atomic percent tantalum; between about 16 atomic percent and about 22 atomic percent silicon; up to about 6 atomic percent germanium; up to about 5 atomic percent boron; between about 7 atomic percent and about 14 atomic percent chromium; up to about 4 atomic percent iron; up to about 4 atomic percent aluminum; from about 1.5 atomic percent to about 3 atomic percent tin; up to about 3 atomic percent tungsten; up to about 3 atomic percent molybdenum; and a balance of niobium, wherein said niobium silicide refractory intermetallic composite contains a tetragonal phase, said tetragonal phase comprising a volume fraction from 0.35 to 0.5 of said niobium silicide refractory intermetallic composite, and a hexagonal $M_5Si_3$ silicide phase, wherein M is at least one of Nb and Hf and wherein said hexagonal $M_5Si_3$ silicide phase comprises a volume fraction of less than 0.25 of said niobium silicide refractory intermetallic composite, and wherein a ratio of a sum of atomic percentages of niobium and tantalum present in said niobium silicide refractory intermetallic composite to a sum of atomic percentages of titanium and hafnium present in said niobium silicide refractory intermetallic composite has a value from 1.5 to 2.0.

12. The turbine component of claim 11, chromium and iron together comprise between about 7 atomic percent and about 15 atomic percent of said niobium silicide refractory intermetallic composite; and silicon, germanium, and boron together comprise between about 16 atomic percent and about 22 atomic percent of said niobium silicide refractory intermetallic composite.

13. The turbine component of claim 12, wherein said turbine component is a component selected from the group consisting of a bucket, a blade, a rotor, and a nozzle.

14. The turbine component of claim 12, wherein said turbine component is a turbine component in a turbine selected from the group consisting of land-based turbines, marine turbines, aeronautical turbines, and power generation turbines.

15. The turbine component of claim 12, wherein said niobium silicide refractory intermetallic composite includes at least one metallic phase, said metallic phase comprising at least 30 volume percent of said niobium silicide refractory intermetallic composite.

16. The turbine component of claim 12, wherein said niobium silicide refractory intermetallic composite includes at least one Laves phase, said Laves phase comprising up to about 20 volume percent of said niobium silicide refractory intermetallic composite.

17. The turbine component of claim 12, wherein said niobium silicide refractory intermetallic composite is resistant to oxidation at temperatures in the range from between about 1800° F. to about 2200° F.

18. The turbine component of claim 17, wherein a radius of a cylindrical sample formed from said niobium silicide refractory intermetallic composite changes less than about 6 mils due to oxidation of said sample when said sample is heated to about 2200° F. for 100 hours.

* * * * *